(12) United States Patent
Egbert et al.

(10) Patent No.: US 6,728,246 B1
(45) Date of Patent: Apr. 27, 2004

(54) ARRANGEMENT FOR REDUCING LAYER 3 HEADER DATA SUPPLIED TO SWITCHING LOGIC ON A NETWORK SWITCH

(75) Inventors: Chandan Egbert, San Jose, CA (US); Mrudula Kanuri, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/502,570

(22) Filed: Feb. 11, 2000

Related U.S. Application Data

(60) Provisional application No. 60/169,295, filed on Dec. 7, 1999.

(51) Int. Cl.[7] .............................. H04L 12/28; H04J 3/16
(52) U.S. Cl. ..................... 370/392; 370/469; 709/242
(58) Field of Search ................................. 370/352, 353, 370/355, 389, 392, 393, 465, 466, 467, 469, 475, 400, 422; 709/230, 238, 240, 242

(56) References Cited

U.S. PATENT DOCUMENTS 5,953,335 A    9/1999   Erimli et al.
6,049,834 A  * 4/2000   Khabardar et al.
6,128,666 A  * 10/2000  Muller et al.
6,256,314 B1 * 7/2001   Rodrig et al.

\* cited by examiner

*Primary Examiner*—Chi Pham
*Assistant Examiner*—Afsar M. Qureshi
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes network switch ports, each including a port filter configured for obtaining and filtering relevant layer 2 and layer 3 information from a received layer 2 frame. Each port filter, upon filtering the relevant layer 2 and layer 3 information from a received layer 2 frame, outputs the relevant layer 2 and layer 3 information to switching logic, enabling the switching logic to perform layer 3 processing to determine a layer 3 switching operation to be performed on the received layer 2 frame. Hence, the switching logic performs the layer 3 processing based on the relevant layer 2 and layer 3 information, without the necessity of parsing the received layer 2 and layer 3 information by the switching logic.

18 Claims, 2 Drawing Sheets

US 6,728,246 B1

ARRANGEMENT FOR REDUCING LAYER 3 HEADER DATA SUPPLIED TO SWITCHING LOGIC ON A NETWORK SWITCH

This application claims priority from Provisional Application No. 60/169,295, filed Dec. 7, 1999.

BACKGROUND OF THE INVENTION

1. Field of the Invention

The present invention relates to layer 2 and layer 3 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). For example, switching fabrics in layer 2 switches merely need to determine an output port for an incoming layer 2 data packet. Layer 3 processing, however, requires implementation of user-defined policies that specify what type of data traffic may be given priority accesses at prescribed intervals; for example, one user defined policy may limit Internet browsing by employees during work hours, and another user-defined policy may assign a high priority to e-mail messages from corporate executives.

One difficulty encountered and layer 3 processing is the substantial overhead that layer 3 switching logic must perform before actually performing the layer 3 switching decisions. For example, one layer 2 switch has a switching module that is configured to monitor layer 2, and possibly layer 3, header information as the layer 2 data packet is being transferred from a network switch port to a buffer memory; hence, the switching module is able to "snoop" on the first forty bytes of a received data packet for layer 2 and layer 3 header information during transfer from a network switch port to buffer memory. However, the switching module then needs to parse the layer 2 header and the layer 3 header to obtain the relevant address information for performing layer 2 or layer 3 switching decisions. This parsing of the layer 2 header and layer 3 header by the switching module imposes substantial processing burdens on the switching module that affects the cost of the network switch, and may adversely affect the ability of the network switch to perform layer 3 processing at the wire rate.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets.

There is also a need for an arrangement that enables a switching module of a network switch to perform layer 3 processing of user-defined policies at the network wire rate on layer 2 data packets, without the necessity of parsing incoming layer 2 and layer 3 headers for switching information.

These and other needs are attained by the present invention, where a network switch includes network switch ports, each including a port filter configured for obtaining and filtering relevant layer 3 information from a received layer 2 frame. Each port filter, upon filtering the relevant layer 3 information from a received layer 2 frame, outputs the relevant layer 3 information to switching logic, enabling the switching logic to perform layer 3 processing to determine a layer 3 switching operation to be performed on the received layer 2 frame. Hence, the switching logic performs the layer 3 processing based on the relevant layer 3 information, without the necessity of parsing the received layer 3 information by the switching logic.

One aspect of the present invention provides a method in a network switch. The method includes receiving a first layer 2 frame at a network switch port, the first layer 2 frame including layer 3 header information. The method also includes outputting selected portions of the layer 3 header information from the network switch port, and generating a layer 3 switching decision in a switching module based on the selected portions of the layer 3 header information. The outputting of selected portions of the layer 3 header information from the network switch port ensures that the switching module receives only relevant layer 3 header information, enabling the switching module to generate the layer 3 switching decision based on the selected portions of the layer 3 header information, without the necessity of any parsing by the switching module. Moreover, the outputting of the selected portions of the layer 3 header information by the network switch port enables each of the network switch ports to provide distributed processing of incoming layer 3 data, eliminating the necessity of processing overhead by the switching module. Hence, the switching module can be optimized for performing layer 3 switching decisions, as opposed to performing overhead functions such as parsing layer 3 header information to eliminate nonrelevant data.

Another aspect of the present invention provides an integrated network switch configured for executing layer 3 switching decisions, the integrated network switch having network switch ports. Each network switch port comprises a port filter configured for obtaining layer 3 information from a received layer 2 frame and outputting portions of the layer 3 information based on a determined relevance of the portions for generation of a layer 3 switching decision. The network switch also includes a switching module for generating the layer 3 switching decision based on the portions of the layer 3 information. Hence, each network switch port can easily filter nonrelevant layer 3 information, and output only those portions of the layer 3 information, to the switching module, which are relevant to generation of a layer 3 switching decision. Hence, layer 3 processing overhead within the switching module is minimized.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
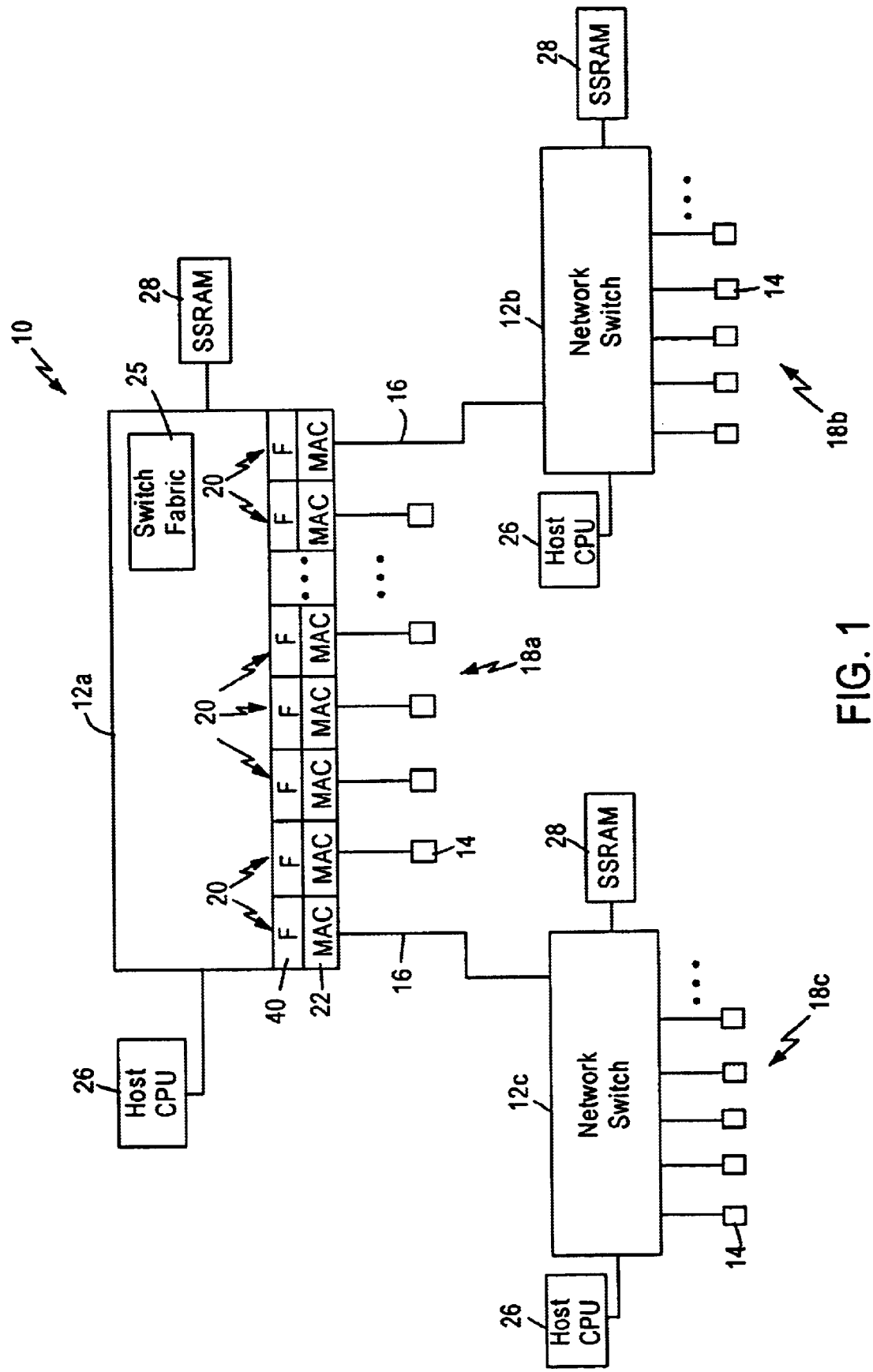
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a plurality of network switch ports 20. Each network switch port 20 includes a media access control (MAC) module 22 that transmits and receives data packets to the associated network stations 14 across 10/100 Mbps physical layer (PHY) transceivers (not shown) according to IEEE 802.3u protocol, and port filters (F) 40. Each port filter 40 is configured for identifying relevant layer 2 and layer 3 information from a received layer 2 frame, described below, and outputting the relevant layer 2 and layer 3 information to a switch fabric 25. The switch fabric 25 is configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

According to the disclosed embodiment, each port filter 40 of FIG. 1 is configured for performing layer 3 processing that identifies relevant layer 3 information, from a received layer 2 frame, that is used by the switching logic 25 to perform layer 3 processing. Hence, the port filter 40 filters out nonrelevant portions of the layer 3 header, eliminating the necessity for the switching fabric 25 to perform any parsing of the layer 3 information supplied from the switch port 20. For example, the port filter 40 can be implemented as a state machine that monitors the bytes coming in from the network, hence the state machine needs to store only 1–2 bytes of incoming data before it can determine whether the received bytes are relevant for performance of a layer 3 switching decision.

Figures 2, 3:
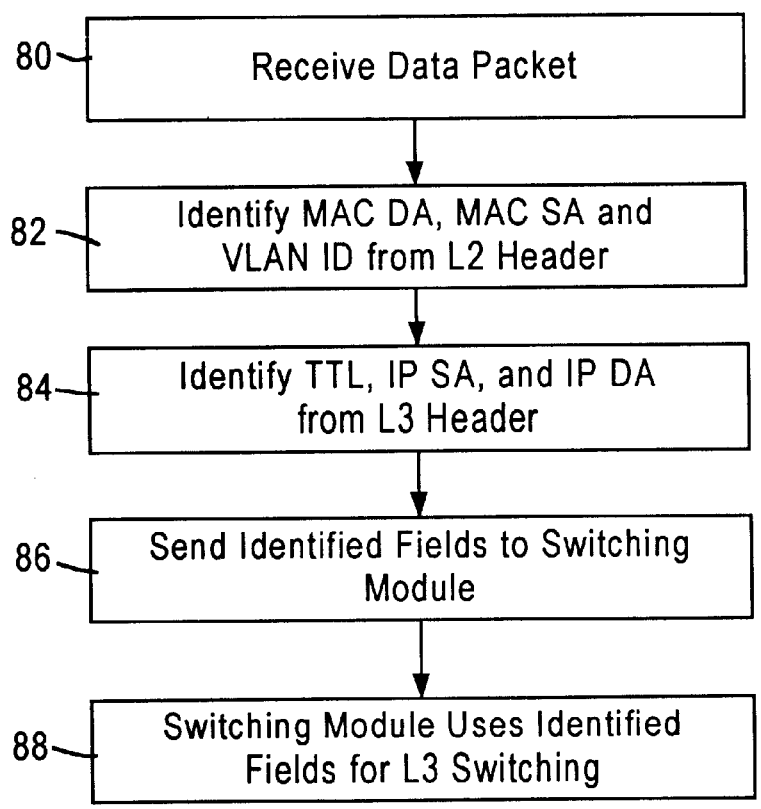
FIG. 2 is a diagram illustrating an Internet Protocol (IP) header.
FIG. 3 is a diagram illustrating the method of supplying relevant portions of an IP header from a network switch port to a switching module according to an embodiment of the present invention.

FIG. 2 is a diagram illustrating in detail a layer 2 header and an IP header of an IP datagram transported across an Ethernet (IEEE 802.3) network. As shown in FIG. 2, the header 50 includes a layer 2 header portion 52 and a layer 3 (IP) header portion 54. FIG. 3 is a diagram illustrating a method of identifying relevant layer 2 and layer 3 information for a layer 3 switching module according to an embodiment of the present invention. The method begins in step 80, where a network switch port 20 receives a layer 2 data packet. The port filter 40 of the corresponding network switch port 20 then identifies from the layer 2 header 52 the MAC destination address, MAC source address, and VLAN identifier in step 82 as relevant for a layer 3 frame forwarding decision.

As shown in FIG. 2, each field within the layer 2 header portion 52 or the layer 3 header portion 54 having an asterisk indicates a field that is relevant to the switching logic 25 for generating a frame forwarding decision. Hence, the relevant fields in the layer 2 header portion 52 for the switching fabric 25 include the MAC destination address, MAC source address, and VLAN ID; however, the VLAN Ethertype field is used to specify that the following two bytes are VLAN ID, and hence are not relevant for a layer 2 or layer 3 switching decision.

The relevant fields for a layer 3 switching decision in the IP header portion 54 include the time to live (TTL) field, IP source address, and IP destination address. The port filter 40 thus identifies as relevant from the IP header 54 of the time to live (TTL) field, the IP source address, and the IP destination address in step 84. As recognized in the art, the time to live field is decremented each time a packet hops through another router; once the time to live field is decremented to zero, the router drops the packet to prevent IP packets from traveling in a loop. Hence, the switching logic 25 acts a router and decrements the TTL field; if the TTL field reaches zero, then the switching logic 25 drops the packet.

The remaining fields of the IP header portion (e.g., IP length, Version/IHL/TOS, Fragment Offset, 1/DF/UF, IP Identifier, Checksum, and Layer 4 protocol) are not relevant for a layer 3 switching decision, hence would be filtered by the port filter 40.

The port filter 40 sends the identified fields (MAC SA, MAC DA, VLAN ID, IP SA, TTL, and IP DA) to the switch fabric 25 in step 86. The switching module 25 then uses the fields supplied as relevant to layer 3 switching to generate the necessary layer 3 switching decision in step 88 for the received data packet.

According to the disclosed embodiment, an arrangement is provided for filtering an incoming IP header and supplying selected fields of the incoming IP header to the switching module 25, enabling the switching module to begin immediate processing of the received data, as opposed to performing any parsing of the IP header. Hence, the processing requirements of the switching logic 25 is reduced by eliminating filtering functions; moreover, buffer size is within the switching module 25 are also reduced since nonrelevant data is no longer provided to the switching module 25.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch the method comprising:
   receiving a first layer 2 frame at a network switch port, the first layer 2 frame including layer 3 information;
   outputting selected portions of the layer 3 header information from the network switch port, wherein the outputting step includes selecting the portions of the layer 3 header information that are relevant to generation of the layer 3 switching decision; and
   generating a layer 3 switching decision in a switching module based on the selected portions of the layer 3 header information.

2. The method of claim 1, wherein the selecting step includes selecting at least an Internet Protocol (IP) source address field and an IP destination address field for the selected portions.

3. The method of claim 2, wherein the selecting step further includes selecting a time to live (TTL) field for the selected portions.

4. The method of claim 2, wherein the outputting step further includes outputting selected portions of layer 2 header information in the first layer 2 frame from the network switch port, the generating step including generating the layer 3 switching decision based on the selected portions of the layer 2 header information.

5. The method of claim 4, wherein the step of outputting selected portions of layer 2 header information includes selecting at least a Media Access Control (MAC) destination address field and MAC source address field for the selected portions of the layer 2 header information.

6. The method of claim 5, wherein the step of outputting selected portions of layer 2 header information further includes selecting a Virtual Local Area Network (VLAN) identifier field for the selected portions of the layer 2 header information.

7. The method of claim 1, wherein the outputting step includes outputting selected portions of layer 2 header information in the first layer 2 frame from the network switch port, the generating step including generating the layer 3 switching decision based on the selected portions of the layer 2 header information.

8. The method of claim 7, wherein the step of outputting selected portions of layer 2 header information includes selecting at least a Media Access Control (MAC) destination address field and MAC source address field for the selected portions of the layer 2 header information.

9. The method of claim 8, wherein the step of outputting selected portions of layer 2 header information further includes selecting a Virtual Local Area Network (VLAN) identifier field for the selected portions of the layer 2 header information.

10. An integrated network switch configured for executing layer 3 switching decisions, the network switch comprising:
    a plurality of network switch ports, each network switch port including a port filter configured for obtaining layer 3 information from a received layer 2 frame and outputting portions of the layer 3 information based on a determined relevance of the portions for generation of a layer 3 switching decision; and
    a switching module configured for generating the layer 3 switching decision based on the portions of the layer 3 information.

11. The switch of claim 10, wherein the port filter outputs at least an Internet Protocol (IP) source address field and an IP destination address field from the received layer 2 frame for the selected portions.

12. The switch of claim 11, wherein the port filter further outputs a time to live (TTL) field from the received layer 2 frame for the selected portions.

13. The switch of claim 12, wherein the port filter further outputs selected portions of layer 2 header information in the received layer 2 frame, the switching module generating the layer 3 switching decision based on the selected portions of the layer 2 header information.

14. The switch of claim 13, wherein the port filter outputs at least a Media Access Control (MAC) destination address field and a MAC source address field for the selected portions of the layer 2 header information.

15. The switch of claim 14, wherein the port filter further outputs a Virtual Local Area Network (VLAN) identifier field for the selected portions of the layer 2 header information.

16. The switch of claim 10, wherein the port filter further outputs selected portions of layer 2 header information in the received layer 2 frame, the switching module generating the layer 3 switching decision based on the selected portions of the layer 2 header information.

17. The switch of claim 16, wherein the port filter outputs at least a Media Access Control (MAC) destination address field and a MAC source address field for the selected portions of the layer 2 header information.

18. The switch of claim 17, wherein the port filter further outputs a Virtual Local Area Network (VLAN) identifier field for the selected portions of the layer 2 header information.

* * * * *